INVENTOR.
Lloyd H. Knost

UNITED STATES PATENT OFFICE 2,474,534

GROUNDING SHOE FOR WELDING MACHINES

Lloyd Hugh Knost, Webb City, Mo.

Application May 27, 1946, Serial No. 672,471

1 Claim. (Cl. 173—324)

This invention relates to welding equipment in the nature of a machine designed particularly for holding the work being treated and has for its primary aim the provision of such apparatus as will accommodate parts of different size, form and contour as the welding operation progresses and that will include means for grounding the parts automatically as movement thereof occurs.

One of the most important objects of this invention is the provision of a welding machine in the nature of a work-holder for cylindrical objects that are to be seam or butt welded and that must be fully and adequately grounded electrically during the entire operation.

Further aims of the invention are to provide a machine of the aforementioned character wherein is included an unique, adjustable frame and inter-related base for carrying the welding machine and the work respectively, which frame permits adjustment and has a specially formed track upon which the welding equipment with one electrode is mounted for movement with respect to the work as the work is motivated upon the said base; to provide a friction grounding shoe on the base for the work that will be yieldably maintained in operative position; and to provide motivating supports for the work on the base below the aforesaid frame.

Other objects of the invention will appear during the course of the following specification referring to the accompanying drawing, wherein.

Figure 1:
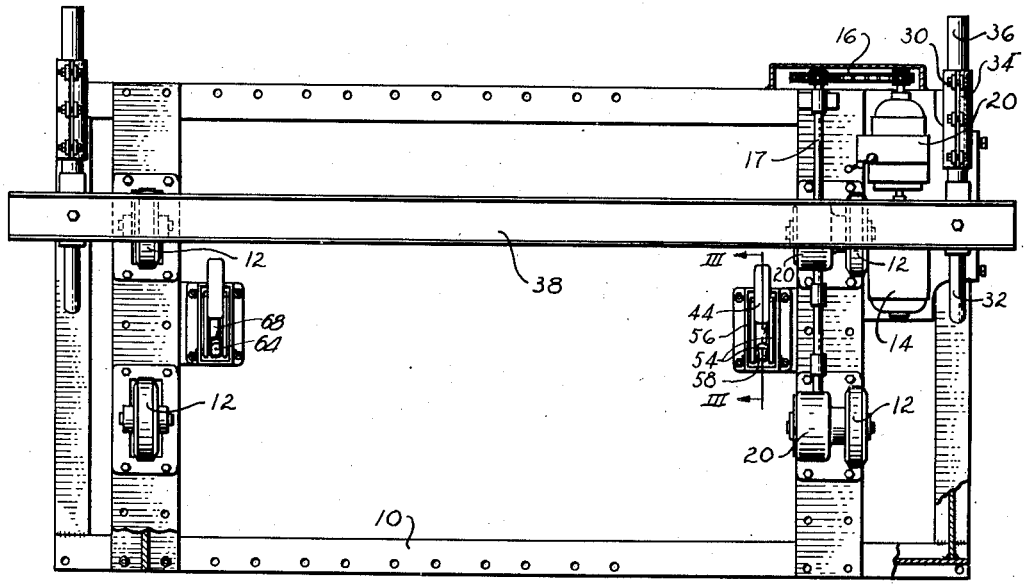
Fig. 1 is a top plan view of a welding machine made in accordance with the present invention.

The welding machine chosen for illustration comprises a base 10 upon which is mounted a plurality of work supporting and motivating rollers 12, one pair of which is operably interconnected to a motor 14 through the medium of a sprocket chain 16, a shaft 17, speed reducers 20 and such related parts as will establish a driving connection to rotate one of rollers 12, as clearly shown in Fig. 1.

The frame on base 10 is generally designated by the numeral 22 and includes a number of vertically adjustable standards 24 having a fixed section 26 and a movable section 28 in telescoped relation with said section 26. Section 26 is split and provided with a number of clamping bolts 30 whereby section 28 may be frictionally gripped to hold the parts of standard 24 in a desired adjusted position. A brace 32, extending from near the top of lower section 26 to a point on base 10 remote from said standard section 26, insures rigidity of the said vertically adjustable standards 24, of which there are two.

Figure 2:
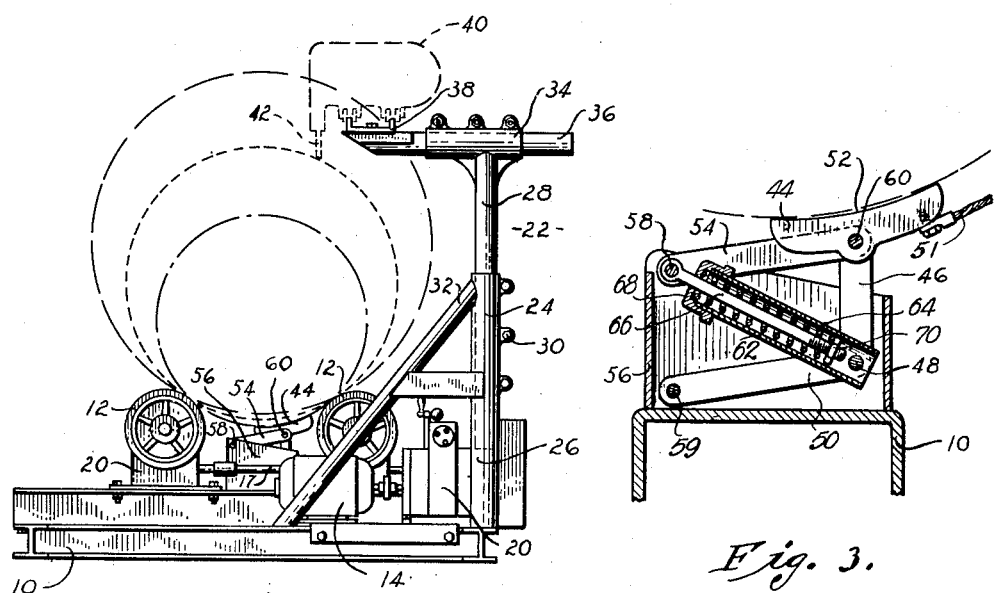
Fig. 2 is an end elevational view thereof.

A tubular head 34 on each standard 24 is likewise split longitudinally to receive a horizontally adjustable member 36 slidably mounted within head 34. One end of member 36 overhangs that portion of base 10 which mounts rollers 12 and a track 38 bridges the distance between members 36, as shown in Fig. 1. It is upon this track that the traveling welding machine 40, having an electrode 42, is arranged for movement along the length of track 38 above the work shown in dotted as well as in dash and dotted lines of Fig. 2. There are three sizes of cylindrical members illustrated in broken lines in Fig. 2 to clarify the versatility of the work holder and to indicate that electrode 42 may be brought into contact with work of most any size.

A longitudinal weld is accomplished by moving welding equipment 40 and 42 along track 38 while the work is stationary upon rollers 12. When a circular weld is to be created, the welding machine 40 remains stationary and rollers 12 are used to permit rotation of the work. In any instance, the novel means for grounding the work is capable of performing its function.

This grounding element of the machine comprises a block 44, mounted at the upper end of a double stem 46. A pin 48 joins the lower ends of stems 46 between which ends is disposed one pair of a set of parallel arms 50 designed to hold arcuate face 52 in contact with the work.

Figure 3:
Fig. 3 is an enlarged fragmentary detailed sectional view taken on line III—III of Fig. 1.

Another pair of arms 54 are mounted in housing 56 as shown in Fig. 3. One end of the pair of arms 54 is pivotally attached to housing 56 as at 58, while the other end thereof is connected to block 44 as at 60. The end of the pair of arms 50 opposite from pin 48 is connected to the housing 56 by a cross pin 59. A flexible ground cable 51 supplements the remaining parts of the grounding element assembly by having one end thereof bolted to block 44 and the other end, not here shown, affixed to any part of the frame or ground.

To maintain arcuate face 52 of block 44 in frictional engagement with the work, a spring 62 is provided within a cylinder 64, one end whereof is pivotally engaged by pin 48. A rod 66 slidable longitudinally within cylinder 64 has spring 62 wound thereabout and one end of rod 66 is pivotally joined to pivot pin 58. One end of spring 62 bears against cap 68 on cylinder 64 while the other end bears against a nut 70 on rod 66. As spring 62 exerts its force, stems 46 will be urged upwardly to carry block 44 in proximity to the work. Thus, a constant and effective grounding of the work is established to cooperate with the welding machine in completing the circuit necessary for the welding operation. The multiple adjustments permitted between the parts of the frame insure that the welding machine and its electrode will be correctly positioned with respect to the work and relatively great speed is made possible when the equipment above described is employed.

The work is roughly assembled through tack welding prior to its being moved into place on the work-holder and aforesaid rollers, after which exceptionally speedy and continuous welding may occur with but one person attending the operation.

It is realized that equipment having physical characteristics other than those shown and described might be made without departing from the spirit of the invention or scope of the appended claim.

Having thus described my invention, what I claim as new and desire to secure by Letters Patent is:

Grounding apparatus for a welding machine comprising a pair of arms mounted adjacent one end thereof for swinging movement on spaced axes; a link pivotally joining the arms near the opposite ends thereof; a grounding shoe formed from conducting material on one of the arms; means for electrically grounding said shoe; and elements for holding said shoe biased against work to be welded in said machine, said elements including a pair of relatively telescoped members joined to the arms for swinging the same toward the work when the members are moved together toward a fully collapsed condition, and a spring between the members for yieldably holding the members in said condition, one of said members being pivotally joined to one arm at its swinging axis, the other member being joined to the other arm at its pivotal joinder with said link.

LLOYD HUGH KNOST.

REFERENCES CITED

The following references are of record in the file of this patent:

UNITED STATES PATENTS

| Number | Name | Date |
| --- | --- | --- |
| 1,206,737 | Steinberger | Nov. 28, 1916 |
| 1,638,024 | Woodrow | Aug. 9, 1927 |
| 1,839,437 | Priebe | Jan. 5, 1932 |
| 1,840,251 | Priebe et al. | Jan. 5, 1932 |
| 1,910,259 | Raymond | May 23, 1933 |
| 2,110,632 | Mitchell | Mar. 8, 1938 |
| 2,153,785 | Williams | Apr. 11, 1939 |

FOREIGN PATENTS

| Number | Country | Date |
| --- | --- | --- |
| 357,062 | Great Britain | Sept. 17, 1931 |